United States Patent [19]

Ogasawara

[11] Patent Number: 4,723,139
[45] Date of Patent: Feb. 2, 1988

[54] CAMERA HAVING AN AUTO-FOCUSING DEVICE

[75] Inventor: Akira Ogasawara, Kawasaki, Japan
[73] Assignee: Nippon Kogaku K.K., Tokyo, Japan
[21] Appl. No.: 41,628
[22] Filed: Apr. 22, 1987

Related U.S. Application Data

[63] Continuation of Ser. No. 875,688, Jun. 18, 1986, abandoned.

[30] Foreign Application Priority Data

Jun. 26, 1985 [JP] Japan .................................. 60-139281
Aug. 23, 1985 [JP] Japan .................................. 60-185547

[51] Int. Cl.⁴ .......................... G03B 3/00; G03B 1/18; G03B 17/40
[52] U.S. Cl. ............................... 354/402; 354/173.11; 354/266
[58] Field of Search ............................. 354/266, 267.1

[56] References Cited

U.S. PATENT DOCUMENTS

| | | | |
|---|---|---|---|
| 3,798,660 | 3/1974 | Hasegawa et al. | 352/140 |
| 4,435,058 | 3/1984 | Yoshida et al. | 354/173.1 X |
| 4,464,037 | 8/1984 | Terui et al. | 354/400 |
| 4,563,069 | 1/1986 | Sakai et al. | 354/402 |
| 4,669,849 | 6/1987 | Ohtsuka et al. | 354/400 |

*Primary Examiner*—W. B. Perkey
*Attorney, Agent, or Firm*—Shapiro and Shapiro

[57] ABSTRACT

A camera having a continuous photographing mode in which an exposure operation and a one frame-wind-up operation of a film are repeatedly carried out, comprising RAM, CCD, A/C convertor, a motor, encoder and AF lens control device. CCD and A/D convertor detect a defocus distance of a photographing lens and forming a data representing. The detected defocus distance and stores said data into the RAM. Motor drives the photographing lens. Encoder detects a driven distance of the photographing lens driven by the motor to generate a detection signal and the motor drives the photographing lens such that the drive distance represented by the detection signal coincides with the defocus distance represented by the data of the RAM. AF lens control device discontinues the drive of the photographing lens by the motor prior to the start of the exposure operation in the continuous photographing mode and resuming the drive in the period of a subsequent one-frame wind-up operation and the device controls the motor such that the motor drives the photographing lens in response to the resumption by a distance corresponding to a difference between the drive distance represented by the detection signal at the time of discontinuance and the defocus distance represented by the data of the RAM.

20 Claims, 6 Drawing Figures

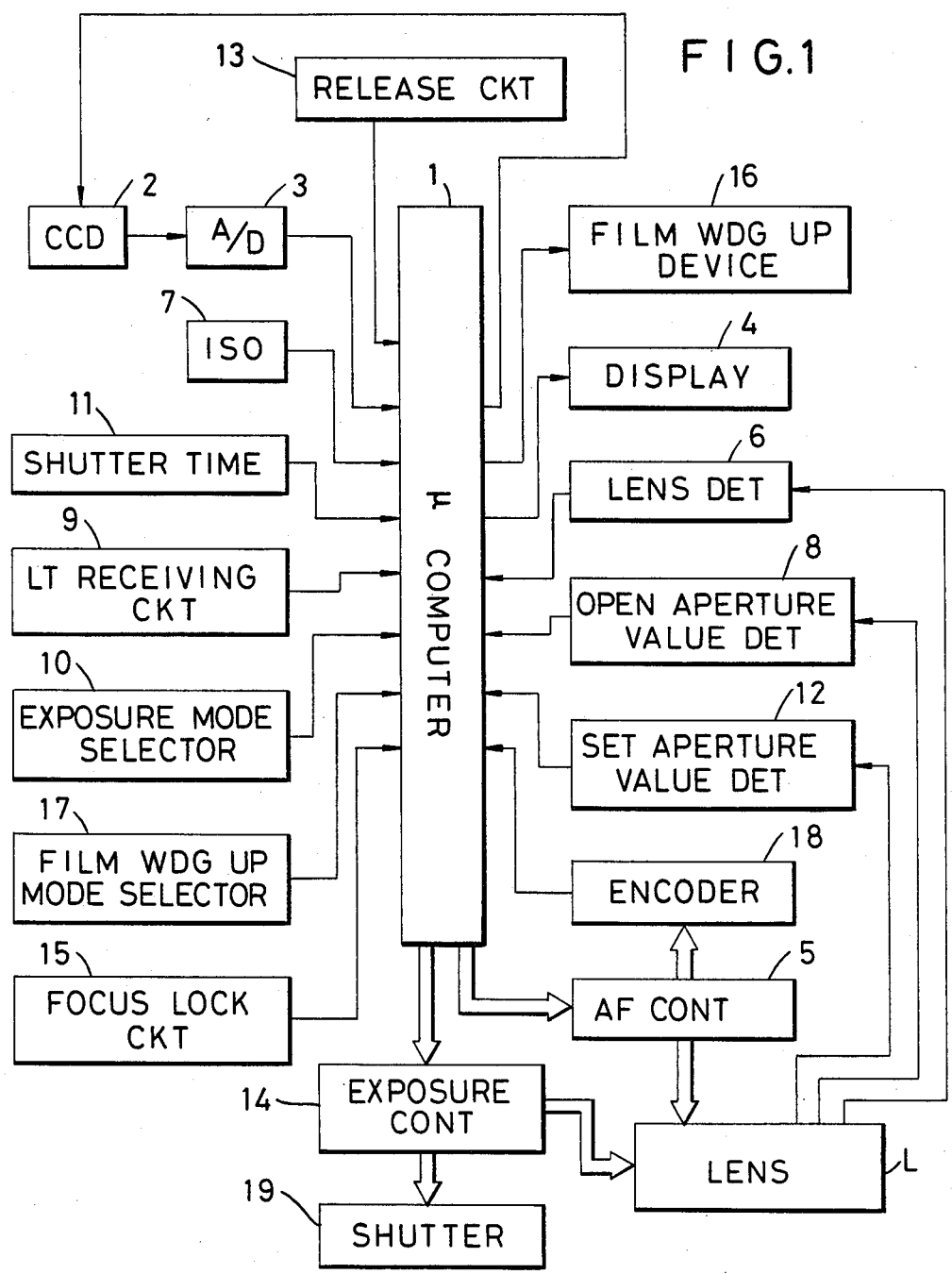

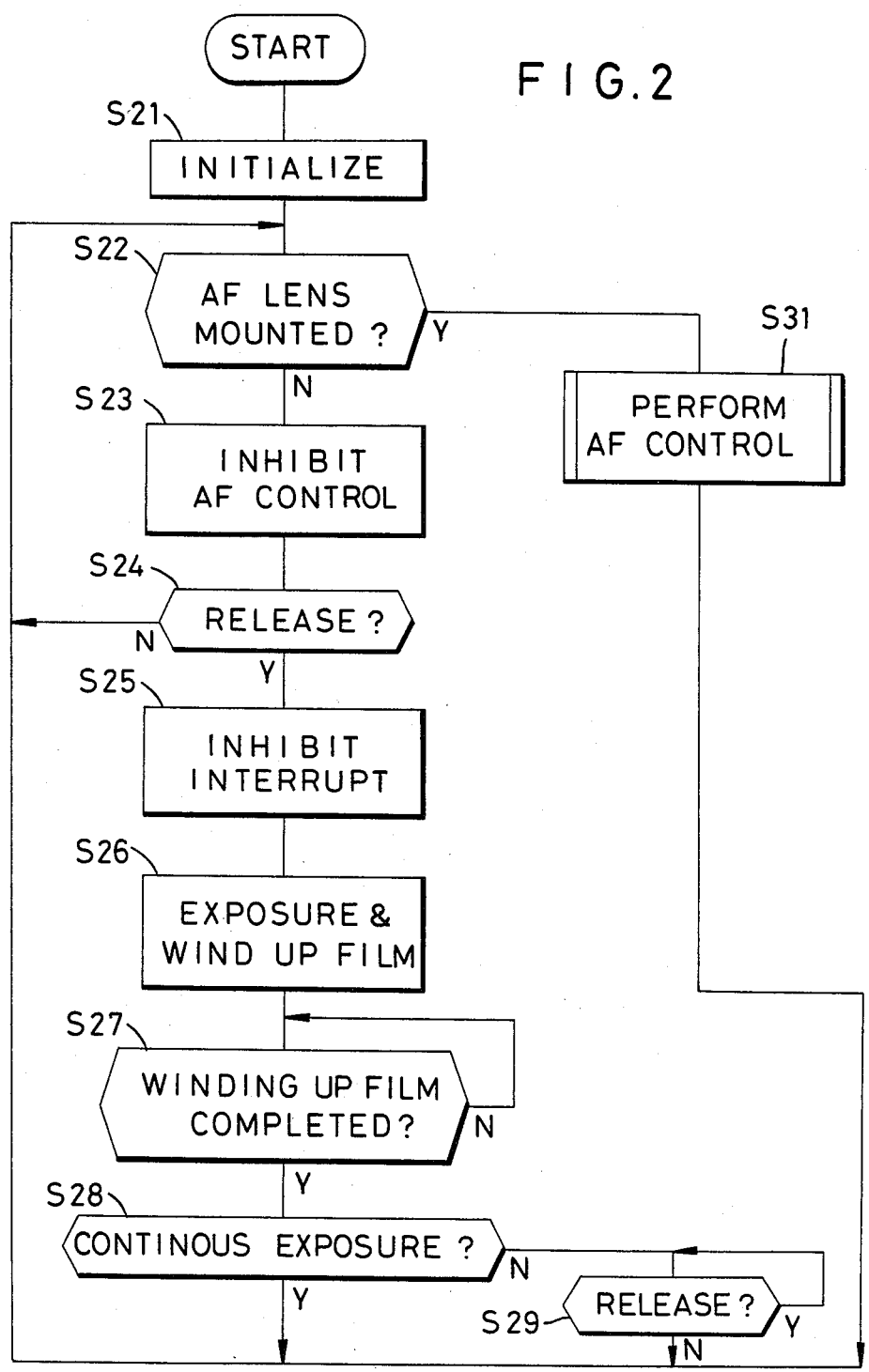

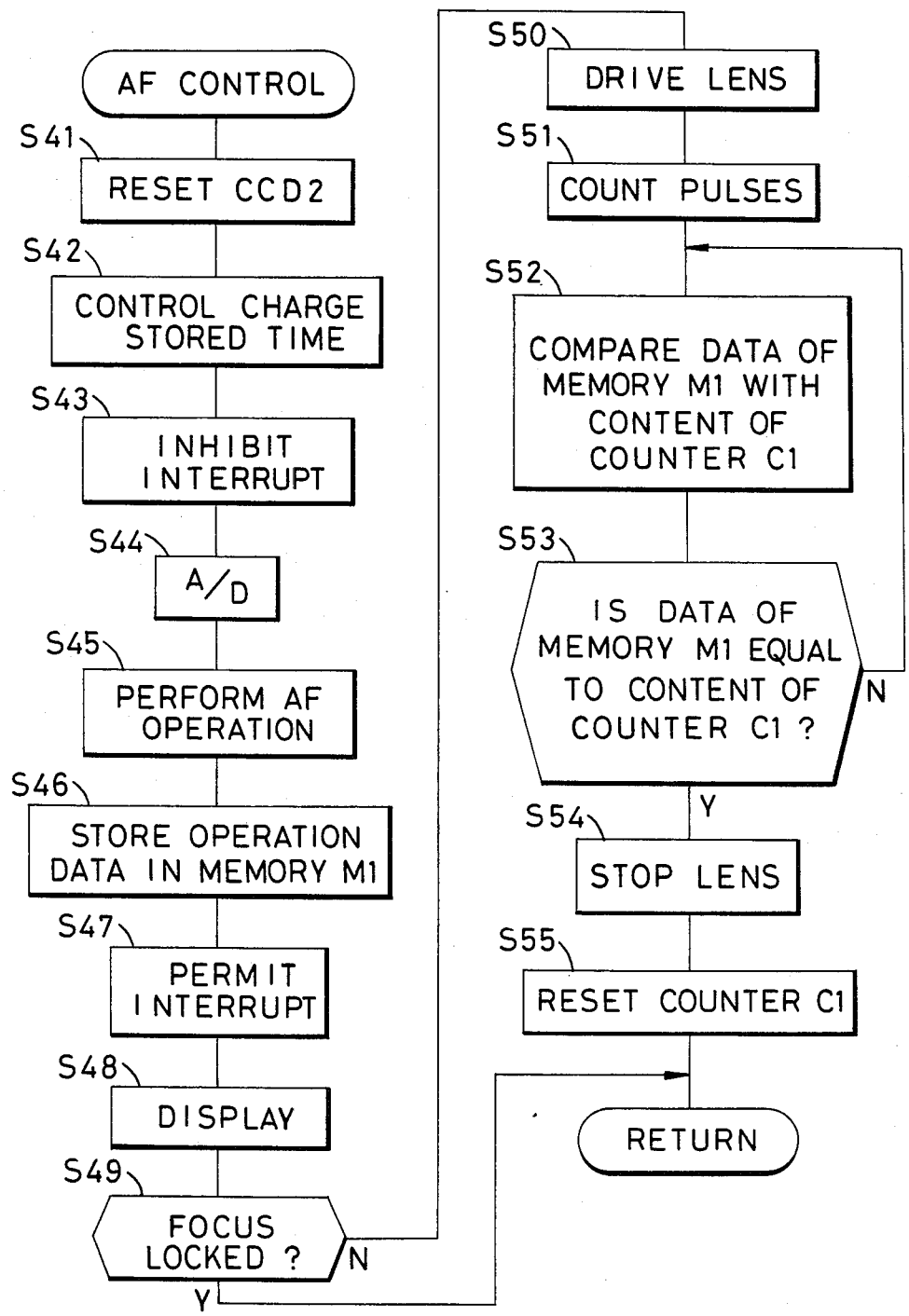

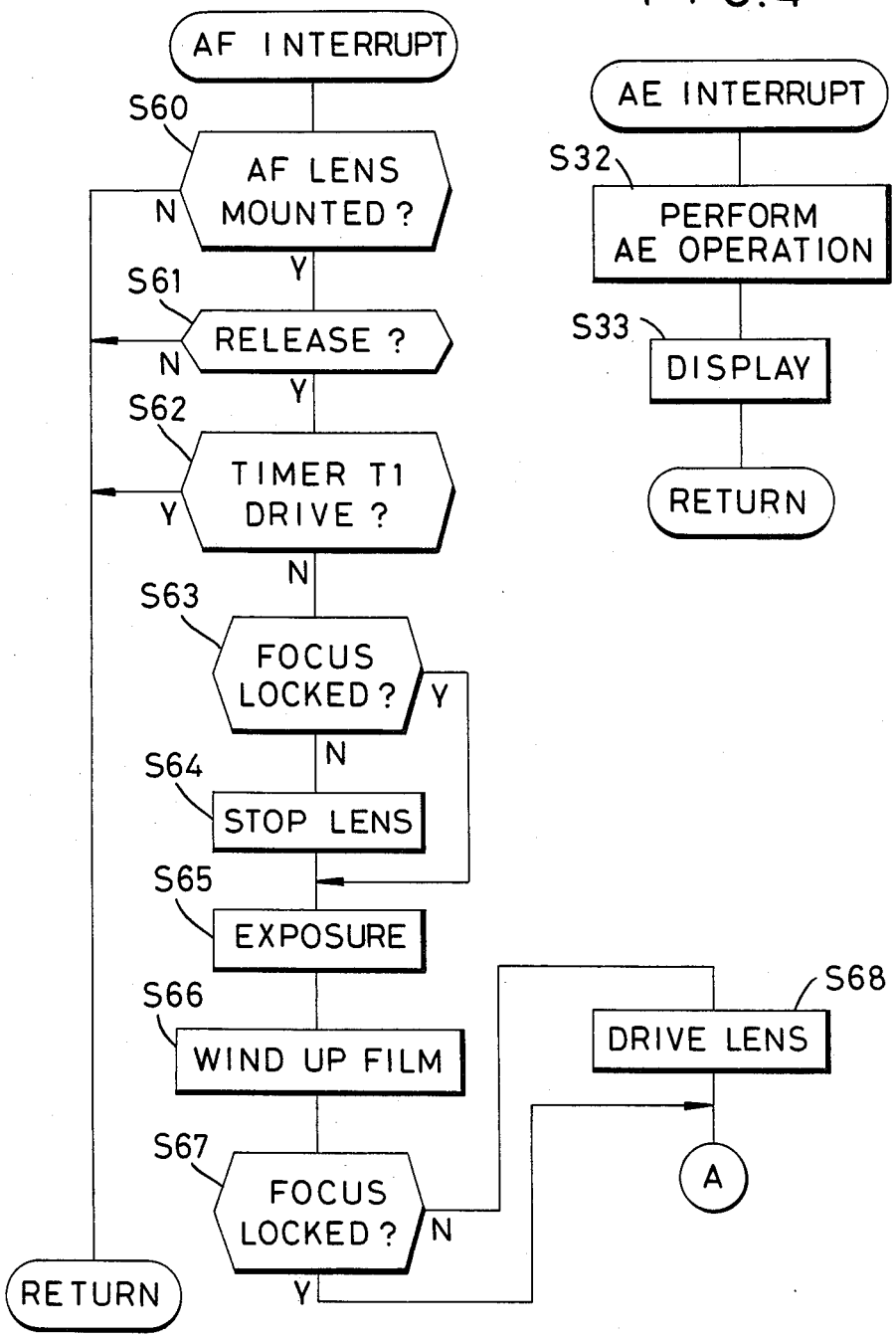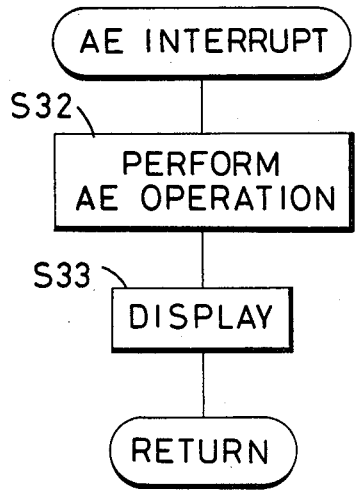

CAMERA HAVING AN AUTO-FOCUSING DEVICE

This is a continuation application Ser. No. 875,688 filed June 18, 1986 now abandoned.

BACKGROUND OF THE INVENTION

1. Field of the Invention

The present invention relates to a single-lens reflex type camera having an auto-focusing device.

2. Related Background Art

A single-lens reflex type camera having an auto-wind mechanism for a film to enable continuous photographing and an auto-focusing device of a TTL focus detection system has been known. In the continuous photographing, exposure to a film and one-frame winding-up of the film are continuously repeated while a release button is depressed. For example, in the continuous photographing, in order to reduce an interval between photographing operations, a photographing lens is stopped at a position set by the auto-focusing device at a time of first frame of photographing and kept at the stopped position until the subsequent photographing operations are completed. In this type of camera, if the release button is depressed in a defocused state at the initial photographing operation, all photographs in the subsequent photographing operations are defocused.

SUMMARY OF THE INVENTION

It is an object of the present invention to provide a camera having an auto-focusing device which assures an in-focus state of a photographing lens during a continuous photographing mode.

In order to achieve the above object, in accordance with the present invention, drive of a lens is discontinued prior to an exposure operation in the continuous photographing mode, and the drive of the lens is resumed upon termination of the exposure operation.

The camera of the present invention can inhibit the drive of the lens. In the continuous photographing mode, and interval between the exposure operations when the drive of the lens is inhibited is shorter than an interval between the exposure operations when the drive of the lens is permitted.

BRIEF DESCRIPTION OF THE DRAWINGS

FIG. 1 shows a block diagram of an embodiment of the present invention, and

FIGS. 2, 3, 4, 5A and 5B illustrate operations of the embodiment of the present invention.

DESCRIPTION OF THE PREFERRED EMBODIMENTS

Figure 5B:
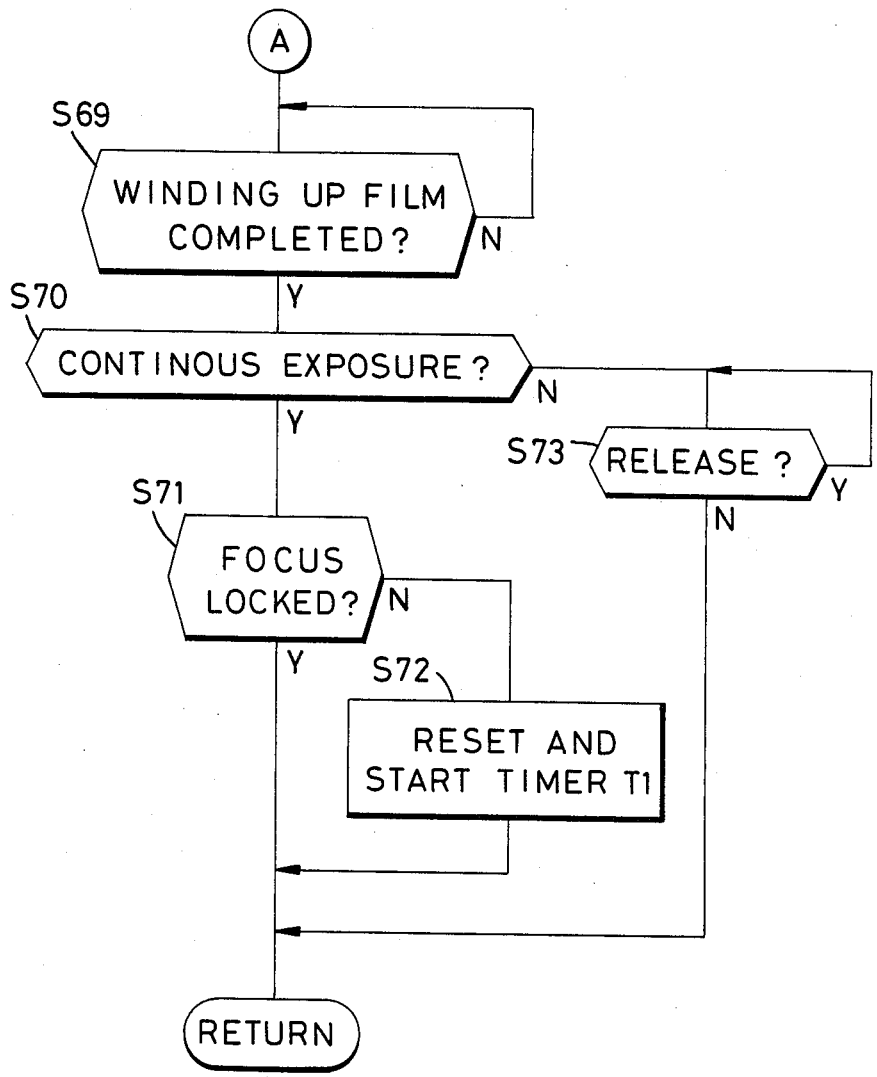

As shown in FIG. 1, a camera contains a microcomputer (MC) 1 by which auto-exposure (AE) and auto-focus (AF) operations are carried out. The MC 1 usually carries out the AE operation and the AF operation in parallel.

The AF operation is first explained. The MC 1 determines by a signal from a lens detector 6 whether a photographing lens L is an auto-focusing (AF) lens or not, and if it is the auto-focusing lens, a charge storage type charge coupled device (CCD) 2 senses a light reflected from an object and an output signal thereof is applied to an A/D converter 3 to convert it to a digital data, which is stored in a memory (RAM) in the MC 1. A plurality of photo-diodes are arranged in a line on the CCD sensor 2. The MC 1 processes the object signal stored in the RAM by an appropriate algorithm, for example, by a known in-focus state detection algorithm to detect a defocus distance of the photographing lens to an in-focus position and stores it in a memory M1. In accordance with the stored defocus distance, an AF lens control unit 5 of the camera drives the photographing lens L to the in-focus position. The in-focus state of the photographing lens is displayed by a display unit 4 in a finder of the camera.

The AE operation is now explained. The MC 1 receives an ISO sensitivity signal from an ISO setting unit 7 of the camera, an open aperture value signal from an open aperture value detector 8 which detects an open aperture value of the photographing lens L, and an object brightness signal from a light metering unit 9. An exposure mode selector 10 selects one of an auto-exposure control mode (shutter time priority mode, aperture priority mode or program mode) and a manual exposure control mode and corresponding signals are applied to the MC 1 from a shutter time setting unit 11 and an aperture value detector 12 which detects the set aperture value of the photographing lens L so that the MC 1 carries out the exposure operation. The result of the exposure operation is displayed by the display unit 4. A release signal of a release circuit 13 which is coupled to a release button is applied to the MC 1 and an exposure control unit 14 in the camera controls the aperture of the lens L and a shutter 19. In the present camera, the operation of the release button is divided into a first stroke and a second stroke.

The display unit 4 drives display device such as LED or liquid crystal. The camera has a film wind-up device 16, which selects one of a continuous photographing mode and a one-frame photographing mode. In response to the depression of the release button in the second stroke, the release circuit 13 generates a release signal for a period in which the release button is depressed. In the one-frame photographing mode, the exposure to the film and one-frame wind-up of the film are carried out one time in response to the depression of the release button in the second stroke.

An encoder 18 generates a pulse in response to rotation of a motor contained in the AF control unit 5 to drive the lens L. A focus lock cirucit 15 generates a focus lock signal while a focus lock button (not shown) is depressed.

A normal photographing sequence of the camera is now explained with reference to FIG. 2. In a step S21, when the release button of the camera is depressed in the first stroke, a power is turned on and the camera is initialized and all circuits in the camera start the operation. In a step S22, whether the photographing lens mounted on the camera is the AF lens or not is checked. If it is the AF lens, the AF signal is supplied from the lens detector 6 to the MC 1, and if it is not the AF lens, the process proceeds to a step S23 where the AF control unit 5 is disabled. In a step S24, whether the release button has been depressed in the second stroke or not is checked. If the decision is NO, the process returns to the step S22. In a step S25, an interrupt is inhibited. In a step S26, the film is exposed in accordance with a result of an AE operation determined in an AE interrupt prior to the step S25 and the exposed film is wound up and the inhibition of interrupt is released. In a step S27, whether the wind-up of the film has been completed or not is checked, and if it has been completed, the process proceeds to a step S28. In the step S28, whether the selected mode is the continuous photographing mode or the one-frame photographing mode is checked, and if it is the one-frame photographing mode, the process proceeds to a step S29. In the step S29, whether the release signal exists or not is checked in the same manner as that in the step S24, and when the release signal terminates, the process goes to the step S22. If it is detected that the AF lens is mounted in the step S22, the process proceeds to a step S31 where the AF control shown in FIG. 3 is carried out.

Referring to FIG. 3, a sub-routine of the AF control is explained. In a step S41, the CCD 2 is reset and it discharges the stored charges. In a step S42, the CCD 2 receives a light from the object and starts to store charges. When a sum of the charges stored in the photodiodes reaches a predetermined level, the store of the charges in the CCD 2 is completed. In a step S43, the interrupt is temporarily inhibited, in a step S44, the charges stored in the CCD 2 are supplied to the A/D converter 3 which supplies a digital data to the MC 1, in a step S45, the AF operation is carried out, and in a step S46, an operation data derived from the AF operation is stored in the memory M1. In a step S47, the interrupt is permitted. In a step S48, the in-focus state is displayed by the display unit 4. In a step S49, whether the focus lock circuit generates the focus lock signal or not is checked. If it is not generated, the AF control unit 5 is activated in a step S50 to drive the lens L so that the object image is focused on the film plane. The encoder 18 generates pulses as the lens L is driven. In a step S51, a counter C1 in the MC 1 counts the pulses supplied from the encoder 18. In a step S52, the defocus distance represented by the data stored in the memory M1 is compared with the drive distance of the lens L represented by the count of the counter C1, and in a step S53, whether the lens L has been driven by the defocus distance represented by the data in the memory M1. If the lens L has been driven by the defocus distance, the process proceeds to a step S54, and if it has not, the process proceeds to the step S52. In the step S54, the AF control unit 5 stop the drive of the lens L, and in a step S55, the counter C1 is reset.

What is calculated by the AF operation are the defocus distance and the defocus direction. The AF lens is driven in the defocus direction determined in the step S50.

The AE interrupt and the AF interrupt in FIGS. 4, 5A and 5B are interrupt routines which are periodically performed in the routine shown in FIG. 2.

In FIG. 4, the AE operation is performed in a step S32 and the result of the AE operation is displayed in a step S33.

In FIGS. 5A and 5B, whether the AF lens is mounted or not is checked by the output of the lens detector 6 in a step S60. In a step S61, whether the release button has been depressed to the second stroke or not is checked by the output of the release circuit 13. If it has been depressed, the process proceeds to a step S62.

In the single-lens reflex type camera of the present invention, the motor to drive the AF lens is contained in the AF control device 5 of the camera body. An IC device is mounted in the AF lens, and no IC device is mounted in a lens other than the AF lens. The lens detector 6 exchanges signals with the IC of the AF lens to detect whether the AF lens has been mounted on the camera body or not and generates the detection signal.

In a step S62, whether a timer T1 in the MC 1 is activated or not is checked. If it is not activated, the process proceeds to a step S63. In the step S63, whether the focus lock signal has been generated or not is checked. If it has not been generated, the process proceeds to a step S64 where the AF control unit 5 stop the drive of the lens, and if the focus lock signal has been generated, the process proceeds to a step S65 where the exposure control unit 14 exposes the film. In a step S66, after the exposure to the film is completed, one frame of film is wound up by the film wind-up unit 16. In a step S67, the decision similar to that of the step S63 is made, and if the focus lock signal has not been generated, the process proceeds to a step S68 where the drive of the AF lens is controlled in the same manner as that in the steps S50 to S54. The AF lens is driven in the film wind-up period. The AF lens is driven in the step S68 only when the AF interrupt has occurred during the steps S50 to S53 of FIG. 3. If the AF interrupt occurs before the data in the memory M1 coincides with the content of the counter C1, the AF lens is stopped in the step S64, and since the counter C1 is not reset, the drive of the AF lens is resumed in a step S68. If the AF interrupt occurs immediately after the end of drive of the AF lens, the lens is not driven in the step S68.

Steps S69, S70 and S73 corresponds to the steps S27, S28 and S29 of FIG. 2, respectively. If the continuous photographing mode is detected in the step S70, the process proceeds to the step S71. In the step S71, the same decision as that in the step S63 is mode, and if the focus lock signal has not been generated, the timer T1 is reset in the step S72 and the timer T1 is started and the process returns to the main routine of FIG. 2. The timer T1 is activated for a predetermined time and the MC 1 does not carry out the steps S63 to S72 while the timer T1 is activated. The drive of the AF lens in the step S68 may be continued even in the steps S69 and S70. The process does not proceed to the step S63 during the activation period of the timer T1.

In the camera which carries out the AF control for each frame in the continuous photographing mode, the film is wound up (in several hundreds milliseconds) after the film has been exposed and then the charges are stored in the CCD for the AF control (for example, in several hundreds milliseconds to one second although it varies with the brightness of the object), the AD conversion is done (in several milliseconds to several tens milliseconds) and the AF operation is carried out (in several tens milliseconds to several hundreds milliseconds). The time of the timer T1 is set to be longer than the sum of those times less the film wind-up time. Alternatively, a focal distance of the AF lens may be detected to change the time of the timer T1 in accordance with the focal distance.

Where a moving object is photographed in the continuous photographing mode, the shutter button may be released without perfect in-focus state being attained. Since the movement of the object usually has directivity, the AF control is done in accordance with the defocus distance stored at the beginning of the release operation so that the AF control can well follow the movement of the object.

If the focus is locked in the continuous photographing mode, high speed continuous photographing is attained.

While the timer T1 is started after the film has been wound up in the above embodiment, it may be wound after the exposure to the film. In this case, the film wind-up time is to be added to the time of the timer T1.

I claim:

1. A camera having a continuous photographing mode in which an exposure operation and a one-frame wind-up operation of a film are repeatedly carried out, comprising:
   (a) memory means;
   (b) data forming means for detecting a defocus distance of a photographing lens and forming a data representing the detected defocus distance;
   said data forming means storing said data into said memory means;
   (c) drive means for driving said photographing lens;
   (d) signal generating means for detecting a drive distance of said photographing lens driven by said drive means to generate a detection signal;
   said drive means driving said photographing lens such that the drive distance represented by the detection signal coincides with the defocus distance represented by the data of said memory means; and
   (e) control means for discontinuing the drive of said photographing lens by said drive means prior to start of the exposure operation in the continuous photographing mode and resuming the drive during a subsequent one-frame wind-up operation;
   said control means controlling said drive means such that said drive means drives the photographing lens in response to the resumption by a distance corresponding to a difference between the drive distance represented by the detection signal at discontinuance and the defocus distance represented by the data of said memory means.

2. A camera having a continuous photographing mode in which exposure operation and one-frame wind-up operation of a film are repreatedly carried out, comprising:
   (a) memory means;
   (b) focus detection means for detecting a defocus distance of a photographing lens to form a data representing the detected defocus distance;
   said focus detection means storing said data into said memory means;
   (c) drive means for driving said photographing lens;
   (d) signal generating means for detecting a drive distance of the photographing lens to generate a detection signal; and
   (e) drive control means for controlling said drive means in accordance with the detection signal and the data of said memory means;
   said drive control means discontinuing the drive of the photographing lens by said drive means prior to start of the exposure operation in the continuous photographing mode and resuming the drive in response to the completion of the exposure operation;
   said drive control means controlling said drive means such that said drive means drives said photographing lens in response to the resumption by a distance corresponding to a difference between the drive distance represented by the detection signal at the time of discontinuance of the drive and the defocus distance represented by the data of said memory means.

3. A camera according to claim 2 wherein said drive control means drives said drive means such that the drive distance represented by the detection signal coincides with the defocus distance represented by the data of said memory means.

4. A camera according to claim 2 wherein said drive control means includes timer means and inhibits the start of the exposure operation a predetermined time period after the one-frame wind-up operation.

5. A camera according to claim 4 wherein said timer means is activated for said predetermined time period in response to the end of the one-frame wind-up operation, and said drive control means inhibits the start of the exposure operation during the activation of said timer means.

6. A camera according to claim 5 further comprising interval control means for controlling an exposure interval in the continuous photographing mode.

7. A camera according to claim 6 further comprising inhibit signal means for generating an inhibit signal to inhibit the drive of the photographing lens by said drive means;
   said interval control means inhibiting the activation of said timer means in response to said inhibit signal.

8. A camera body having a continuous photographing mode in which an exposure operation and a one-frame wind-up operation of a film are repeatedly carried out, and including focus detection means, and drive means for driving a first photographing lens in accordance with a defocus distance detected by said focus detection means, and a second photographing lens not driven by said drive means and said first photographing lens being exchangeably mounted on said camera body; comprising:
   (a) signal generating means for detecting the mounting of said second photographing lens on said camera body for generating a lens detection signal; and
   (b) control means for controlling an exposure interval in the continuous photographing mode;
   said control means setting the exposure interval to a predetermined time period when said first photographing lens is mounted on said camera body and setting the exposure interval to a shorter period in response to said lens detection signal.

9. A camera according to claim 8 further comprising inhibit signal means for generating an inhibit signal to inhibit said drive means from driving said first photographing lens
   said controlling means setting a shorter exposure interval than said predetermined period in response to said inhibit signal when said first photographing lens is mounted on said camera body.

10. A camera for carrying out a one-frame wind-up operation of a film in response to completion of an exposure operation for exposing one frame of said film, comprising:
    (a) memory means;
    (b) data producing means for detecting a defocus distance of a photographing lens and producing data representing a distance which relates to the detected defocus distance, said data producing means storing said data in said memory means;
    (c) drive means for driving said photographing lens;
    (d) signal generating means for detecting a drive distance of said photographing lens driven by said drive means to generate a detection signal representing a distance which relates to the detected drive distance; and
    (e) control means for discontinuing the drive of said photographing lens by said drive means prior to start of said exposure operation and resuming the drive in response to completion of said exposure operation, said control means controlling said drive means such that said drive means drives the photographing lens, in response to the resumption of the drive, by a distance represented by said detection sigal when the drive is discontinued and the distance represented by the data of said memory means.

11. A camera according to claim 10, wherein said drive means drives said photographing lens such that the distance represented by said detection signal coincides with the distance represented by the data of said memory means.

12. A camera body on which a first photographing lens and a second photographing lens are exchangeably mounted, wherein an optical system of said first photographing lens is driven automatically in accordance with a defocus distance when said first photographing lens is mounted on said camera body and an optical system of said second photographing lens is not driven automatically when said second photographing lens is mounted on said camera body, comprising:

signal generating means for detecting mounting of said second photographing lens on said camera body to generate a lens detection signal; and control means for controlling an exposure interval between an exposure operation and a subsequent exposure operation, said control means setting the exposure interval to a predetermined time period when said first phtographing lens is mounted on said camera body and setting the exposure interval to a period shorter than said predetermined time period in response to said detection signal.

13. A camera body according to claim 12, which further comprises means for generating an inhibit signal to inhibit said first photographing lens from being driven, and wherein said control means sets the exposure interval to a period shorter than said predetermined period in response to said inhibit signal when said first photographing lens is mounted on said camera.

14. A camera comprising:

means for detecting a defocus distance of a photographing lens;

drive means for driving said photographing lens on the basis of the detected defocus distance;

means for generating an inhibit signal to inhibit said drive means from driving said photographing lens;

control means for controlling an exposure interval between an exposure operation and a subsequent exposure operation to set the exposure interval to a predetermined time period, said control means setting the exposure interval to a period shorter than said predetermined time period in response to said inhibit signal.

15. A camera according to claim 14, wherein said control means includes timer means for counting a predetermined value, and wherein said inhibit signal inhibits said timer means from counting.

16. A camera according to claim 15, which further comprises stopping means for stopping said drive means in response to completion of counting by said timer means.

17. A camera according to claim 16, which further comprises wind-up means for winding up one frame of a film in response to completion of the exposure operation, and wherein said timer means starts counting in response to completion of said winding up by said wind-up means.

18. A camera having a continuous photographing mode in which exposure operation and one-frame wind-up operation of a film are repeatedly carried out, comprising:

(a) memory means;

(b) focus detection means for detecting a defocus distance of a photographing lens to form data representing a distance which relates to the detected defocus distance;

said focus detection means storing said data in said memory means;

(c) drive means for driving said photographing lens;

(d) signal generating means for detecting a drive distance of the photographing lens to generate a detection signal representing a distance which relates to the detected defocus distance; and (e) drive control means for controlling said drive means in accordance with the detection signal and the data of said memory means;

said drive control means discontinuing the drive of the photographing lens by said drive means prior to start of the exposure operation in the continuous photographing mode and resuming the drive in response to completion of the exposure operation;

said drive control means controlling said drive means such that said drive means drives said photographing lens, in response to resumption of the drive, by a distance corresponding to a difference between the distance represented by the detection signal at the time of discontinuance of the drive and the distance represented by the data of said memory means.

19. A camera according to claim 18, wherein said drive control means drives said drive means such that the distance represented by the detection signal coincides with the distance represented by the data of said memory means.

20. A camera according to claim 18, wherein said drive control means includes timer means and inhibits the start of the exposure operation a predetermined time period after the one-frame wind-up operation.

* * * * *